(12) United States Patent
Ho et al.

(10) Patent No.: US 6,224,477 B1
(45) Date of Patent: May 1, 2001

(54) METHOD FOR ORDERING SUBSCRIBER RECORDS OF WIRELESS COMMUNICATION NETWORKS

(75) Inventors: Joseph S. M. Ho; Julie Y. C. Liu, both of Dallas; Jim Xu, Plano, all of TX (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/221,357

(22) Filed: Dec. 28, 1998

(51) Int. Cl.[7] .................................................. H04Q 7/20
(52) U.S. Cl. .......................... 453/433; 455/418; 455/422; 455/435
(58) Field of Search ..................................... 455/433, 416, 455/422, 414, 435, 332, 418, 424, 560; 707/3, 10

(56) References Cited

U.S. PATENT DOCUMENTS

| | | | |
|---|---|---|---|
| 5,418,947 | * 5/1995 | Hsu et al. | 395/600 |
| 5,583,850 | * 12/1996 | Snodgrass et al. | 370/342 |
| 5,761,500 | * 6/1998 | Gallant et al. | 395/610 |
| 5,850,603 | * 12/1998 | Lantto et al. | 455/433 |
| 5,941,955 | * 8/1999 | Wilby et al. | 709/242 |
| 5,956,717 | * 9/1999 | Kraay et al. | 707/10 |
| 6,026,291 | * 9/1999 | Carlsson et al. | 455/406 |
| 6,091,952 | * 7/2000 | Xu et al. | 455/433 |
| 6,097,942 | * 8/2000 | Laiho | 455/414 |
| 6,104,931 | * 8/2000 | Havinis et al. | 455/456 |

* cited by examiner

*Primary Examiner*—William G. Trost
*Assistant Examiner*—Congvan Tran
(74) *Attorney, Agent, or Firm*—Carr & Storm, L.L.P.

(57) ABSTRACT

A method for ordering subscriber records in a location database stored in at least one of a Visitor Location Register (VLR) or a Home Location Register (HLR) of a wireless communications network by ordering the subscriber records in subsets according to the access rates of the records. Records within the respective subsets are then ordered in a middle-rootage order based on the subscriber ID of each subscriber record. The subscriber records are then inserted into a binary tree in subset order beginning with the subset containing subscriber records having the highest access rate. This method enables subscriber records to be more economically stored and used than is possible using conventional binary trees and, thereby, increases network capacity.

29 Claims, 6 Drawing Sheets

FIG. 6

| Step | Description | Records |
|------|-------------|---------|
| 502 | Gen 1 Subset | ($r_1$, $r_2$, $r_3$, $r_4$, $r_5$, $r_6$, $r_7$, $r_8$, $r_9$, $r_{10}$, $r_{11}$, $r_{12}$, $r_{13}$, $r_{14}$, $r_{15}$) |
| 502 | To Binary Tree | $r_8$ |
| 504 | Gen 2 Lower Sub | ($r_1$, $r_2$, $r_3$, $r_4$, $r_5$, $r_6$, $r_7$) |
| 504 | Gen 2 Upper Sub | ($r_9$, $r_{10}$, $r_{11}$, $r_{12}$, $r_{13}$, $r_{14}$, $r_{15}$) |
| 506 | To Binary Tree | $r_4$, $r_{12}$ |
| 512 | Gen 3 Lower Sub | ($r_1$, $r_2$, $r_3$) ($r_9$, $r_{10}$, $r_{11}$) |
| 512 | Gen 3 Upper Sub | ($r_5$, $r_6$, $r_7$) ($r_{13}$, $r_{14}$, $r_{15}$) |
| 506 | To Binary Tree | $r_2$, $r_6$, $r_{10}$, $r_{14}$ |
| 512 | Gen 4 Lower Sub | ($r_1$) ($r_5$) ($r_9$) ($r_{13}$) |
| 512 | Gen 4 Upper Sub | ($r_3$) ($r_7$) ($r_{11}$) ($r_{15}$) |
| 506 | To Binary Tree | $r_1$, $r_3$, $r_5$, $r_7$, $r_9$, $r_{11}$, $r_{13}$, $r_{15}$ |
| 510 | Terminate | |

METHOD FOR ORDERING SUBSCRIBER RECORDS OF WIRELESS COMMUNICATION NETWORKS

TECHNICAL FIELD

The invention relates generally to communication networks and, more particularly, to a method for ordering the records of subscribers to wireless communication networks, wherein the records are stored in location databases at Visitor Location Registers (VLR's) and/or a Home Location Register (HLR) of the communication network.

BACKGROUND

Public Land Mobile Networks (PLMN), such as the Global System for Mobile Communications (GSM), are designed as the wireless extension of the Public Switched Telephone Network (PSTN). Subscribers of a PLMN receive voice and data services while they are traveling within the network coverage area. To guarantee the timely and accurate delivery of incoming calls to a subscriber, a PLMN must be able to track the current location of each mobile station, or terminal. This tracking procedure is commonly referred to as location management.

Location management entails the recordation of up-to-date information on the location of each mobile terminal in a distributed network of location databases. Each mobile terminal is required to periodically report its location to the network. On receiving such information, the network updates its records in one or more location databases. When a call for such a mobile terminal arrives at a subsequent time, the location information of the mobile terminal will be retrieved from the location databases and the call is delivered accordingly.

As the number of subscribers using mobile terminals increases, the number of subscriber records that must be stored and updated in location databases increases, resulting in increased processing load on telecommunications switches and databases and increased time to access such subscriber records. As such processing load and access time increases, costs for providing such services increases, and network capacity and subscriber satisfaction diminish.

To alleviate the high processing load and access time, subscriber records are typically organized in a location database structured as a "binary tree". Conventionally, there are a number of types of binary trees available for so organizing records. For example, an optimal, or ideal, binary tree may be generated using well-known techniques wherein records with the highest access rate are placed closest to the root of the tree such that the cost of searching for such records is absolutely minimized. The cost of generating such an optimal tree is, however, generally prohibitive if the number of records to be organized is very large.

Alternatively, a relatively simple binary tree may be randomly generated which requires that subscriber records be ordered as a data structure using as an index the identity of the subscriber's mobile terminal. If a subscriber population is large, the subscriber records may first be partitioned into a number of subsets using a "hash" function. For example, the first 8 bits of the subscriber identity may be used to partition all the subscriber records into $2^8$, or 256, subsets. A binary tree is then generated within each subset of subscriber records. In a randomly generated binary tree, the relative position of a subscriber record depends only on the chronological order in which the records are inserted into the tree. A newly added subscriber record must be positioned at the "bottom" of the tree regardless of the rate with which the record is accessed. As a result of the order in which subscribers are added to the tree, an early subscriber record with a relatively low access rate may be located "higher" in the binary tree and, thus, more economically accessible, than a later subscriber record having a higher access rate. Such a tree, while much less costly to generate than an ideal tree, is generally much less efficient and, therefore, much more expensive to use, than the aforementioned ideal tree in which subscribers having a high access rate are located generally higher and more accessibly in the tree.

The foregoing randomly generated binary tree may be "balanced" to locate an approximately equal number of subscribers on each side of the tree. The access cost of a binary tree, however, may not necessarily decrease by being balanced and, furthermore, may still require more time to access subscribers with high access rates than subscribers with lower access rates. The efficiency of a balanced binary tree is thus not near that of an ideal binary tree.

In yet another binary tree, the subscriber records are first arranged in decreasing order of access rate. The subscriber records are then inserted into the binary tree according to such order. This method guarantees that highly accessed subscriber records are located at the top of the tree. However, this method may generate an extremely unbalanced tree which may not result in lower overall access cost compared to the randomly generated binary tree.

While there are further variations on how a binary tree may be generated using conventional techniques, as exemplified above, each such binary tree is uneconomical with respect to the cost of either generating it or of using it.

Accordingly, a continuing search has been directed to methods for generating a binary tree which can quickly and efficiently access subscriber records in location databases and that is, therefore, more economical to generate and to use than is possible with conventional binary trees.

SUMMARY

The present invention, accordingly, provides a method for generating a binary tree used by a location database by stored in at least one of a Visitor Location Register (VLR) or a Home Location Register (HLR) of a wireless communications network by ordering the subscriber records in subsets according to the access rates of the records. Records within the respective subsets are then ordered in a middle-rootage order based on the subscriber ID of each subscriber record. The subscriber records are then inserted into a binary tree in subset order beginning with the subset containing subscriber records having the highest access rate. This method enables subscriber records to be more economically stored and used than is possible using conventional binary trees and, thereby, increases network capacity.

BRIEF DESCRIPTION OF THE DRAWINGS

For a more complete understanding of the present invention, and the advantages thereof, reference is now made to the following descriptions taken in conjunction with the accompanying drawings, in which:

FIG. 6 is a table exemplifying steps performed during execution of a middle-rootage insertion method on 15 subscriber records.

DETAILED DESCRIPTION

Figure 1:
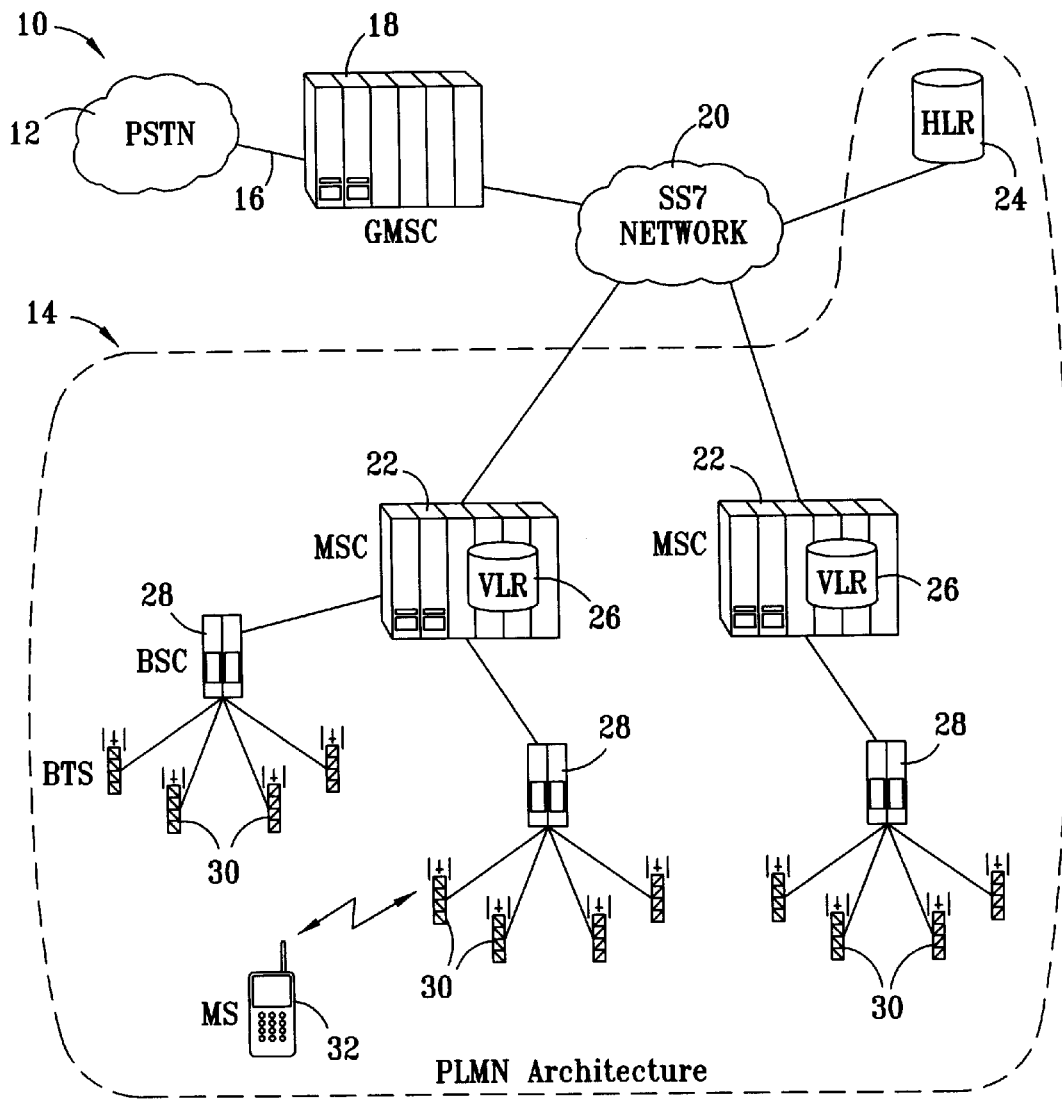
FIG. 1 is a schematic diagram showing various elements of a Public Land Mobile Network (PLMN)
Figure 1A:
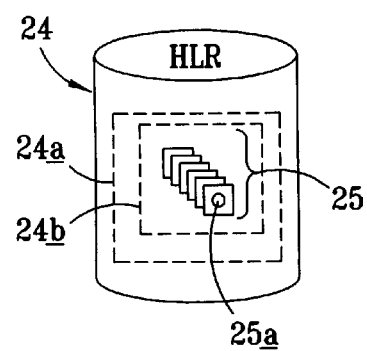
FIGS. 1A and 1B show a Home Location Register (HLR) and a Visitor Location Register (VLR) used in the PLMN of FIG. 1.
Figure 1B:
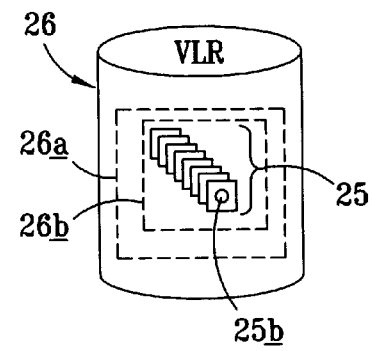

In the discussion of the FIGURES the same reference numerals will be used throughout to refer to the same or similar components. In the interest of conciseness, various components well-known to the art, such as the Signaling System Number 7 (SS7), a Public Switched Telephone Network (PSTN), a Public Land Mobile Network (PLMN), and the like, necessary for the operation of the a communications network, have not been shown or discussed.

Referring to FIG. 1 of the drawings, the reference numeral 10 generally designates an architecture of a communications network. The communications network 10 generally comprises a PSTN 12 and a PLMN 14 interconnected through voice trunk circuits 16, a Gateway Mobile Switching Center (GMSC) 18, and a signaling network 20, such as SS7.

As discussed further below, the PLMN 14 comprises two Mobile Switching Centers (MSC's) 22 connected through the signaling network 20 to a Home Location Register (HLR) 24. Each MSC 22 includes a Visitor Location Register (VLR) 26 and is further connected to at least one Base Station Controller (BSC) 28 to which a number of Base Transceiver Stations (BTS's) 30 are connected for interfacing wirelessly with a mobile station or terminal 32, such as a Cellular Phone, a Personal Communication System (PCS) phone, or the like. It is understood that the number of MSC's 22, HLR's 24, VLR's 26, BSC's 28, BTS's 30, and mobile terminals 32 may vary from the number shown in the Figures and described herein.

The MSC's 22 are configured for switching the trunk circuits 16 and processing signaling messages for call processing and location management. The HLR 24 comprises an electronic memory 24a for storing a location database 24b which contains permanent copy of records 25 for each subscriber, each of which records contain for a respective subscriber information such as the type of services subscribed, service parameters (such as call forwarding numbers), the current serving MSC 22 of the mobile terminal, and the like. Each VLR 26 comprises an electronic memory 26a for storing a location database 26b which contains a temporary copy of the records 25 for subscribers residing in its assigned area. The set of records 25 stored at the HLR 24 may differ from the set of records 25 stored at the VLR 26, but the sake of conciseness of description herein, will be considered the same. In accordance with the present invention, each record 25 in the HLR 24 also includes an access counter 25a associated with it, and each record 25 in the VLR 26 also includes an access counter 25b associated with it, which access counters define a numerical value used in determining the access rate of a subscriber, as discussed further below. When a subscriber using a mobile terminal 32 moves from a first VLR 26 to a second VLR 26, the record 25 associated with the subscriber using the mobile terminal will be relocated from location database 26b of the first VLR to the location database 26b of the second VLR. The second VLR 26 will also inform the HLR 24 of the new location of the mobile terminal 32. In general, the VLR 26 co-locates with its respective MSC 22. The BSC 28 is configured for allocating channels and coordinating the air-interface related signaling messages. The BTS's 30 interface with the mobile terminal 32 through a standardized multiple access protocol. In general, a BSC 28 controls a number of BTS's 30.

When a mobile terminal 32 receives or originates a call, its serving MSC 22 must query its respective VLR 26 and, in some cases, the HLR 24, to obtain the subscription parameters and/or the location information of the mobile terminal 32. Similarly, when the mobile terminal 32 moves from one location to another, it will perform a location update, and the MSC 22 will update the information at the VLR 26 and the HLR 24. It can be appreciated that a large number of subscribers in each PLMN 14 results in a very high processing load at the central HLR 24. As a consequence, network capacity is reduced, and additional HLR's 24 must be installed to enable a network to grow. As discussed above, organizing the subscriber records in an ideal binary tree can reduce such high processing load, but have been found to be uneconomical to either generate or use.

Figure 2A:
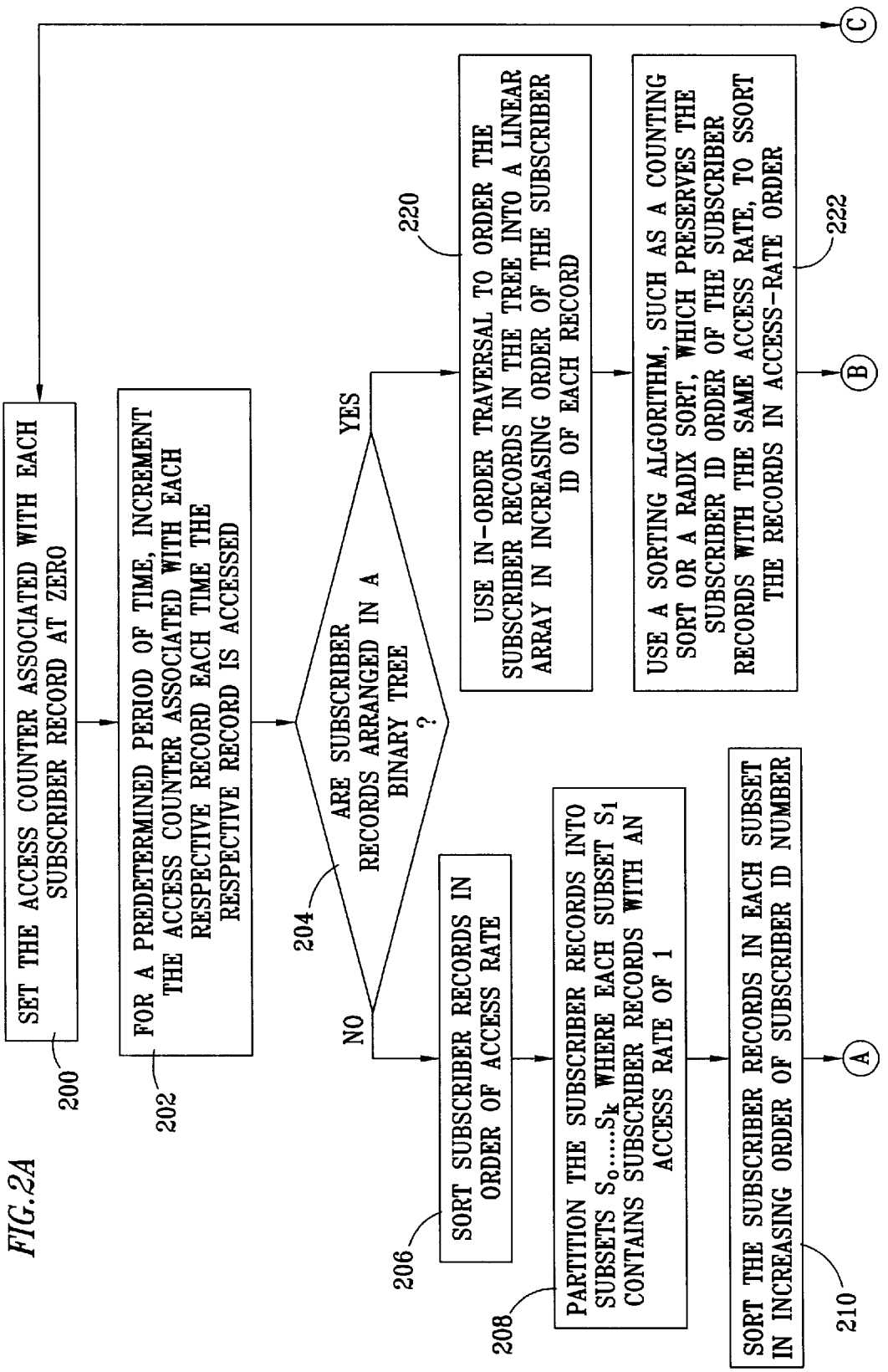
FIG. 2 is a flow chart illustrating steps for generating and regenerating a binary tree in accordance with the present invention.
Figure 2B:
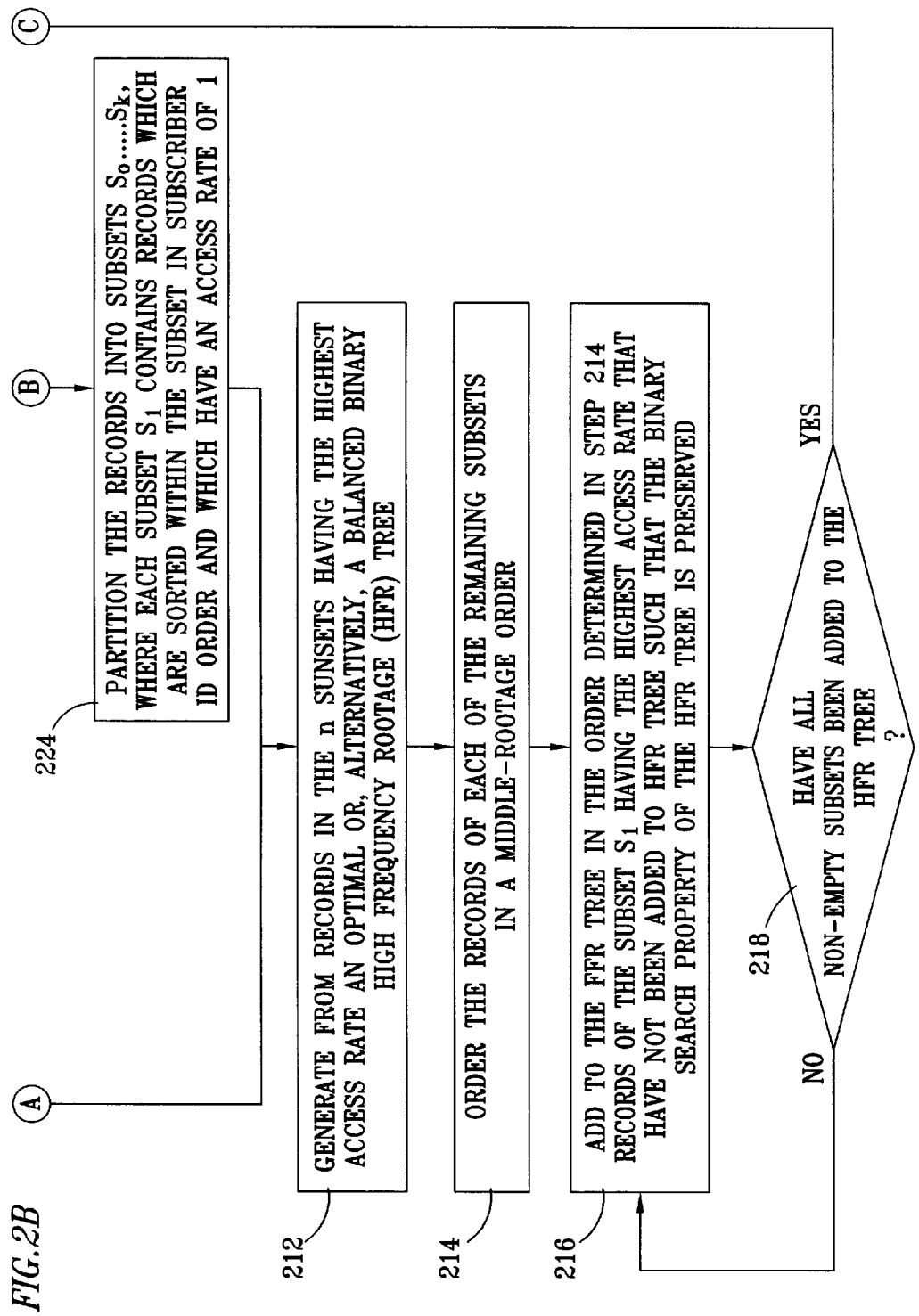

FIG. 2 is a flowchart of steps implemented by the HLR 24 and by the VLR 26 for organizing subscriber records 25 stored in a location database 24b and 26b utilized by a respective HLR or VLR, in accordance with the present invention. Preferably, subscriber records 25 stored in the HLR 24 are organized independently of records stored in the VLR 26 and, similarly, records 25 stored in the VLR 26 are organized independently of records stored in the HLR 24. Additionally, the numerical value represented by each access counters 25a and 25b associated with a record 25 stored in the HLR 24 and in the VLR 26, respectively, is incremented (i.e., in step 202 described below) independently in the HLR and VLR and may differ. For the sake of conciseness, however, the steps depicted in FIG. 2 will be described with respect to the organization of subscriber records 25 (with the access counter 25a) stored in the location database 24b of the HLR 24, it being understood that the organization of subscriber records 25 (with the access counter 25b) stored in the location database 26b of the VLR 26 may be independently achieved in a similar manner.

Accordingly, in step 200, the numerical value of the access counter 25a associated with each subscriber record 25 is set to zero. In step 202, the numerical value of the access counter 25a associated with each subscriber record 25 stored in the location database 24b is incremented by one each time the respective record 25 is accessed during a predetermined period of time, such as one day, a week, or the like. The numerical value of the access counter 25a associated with each subscriber record 25 represents the "access rate" of that respective subscriber record during the period of time that the numerical value was incremented.

In step 204, after the predetermined time set forth in step 202, a determination is made whether the subscriber records 25 are arranged in a binary tree (not shown). If it is determined that the subscriber records 25 are not arranged in a binary tree, then execution proceeds to step 206; otherwise, execution proceeds to step 220, described below.

In step 206, all of the subscriber records 25 in the location database 24b are sorted according to their respective access rate. The order may be ascending or descending, but for the purpose of illustration herein, ascending order will be used. This step 206 may be exemplified using a set of 10 subscriber records 25 $\{r_1, \ldots, r_{10}\}$, wherein the record $r_i$ is the record having subscriber identification (ID) number i, and the records are ordered according to their subscriber ID number. The records, furthermore, have respective access rates of {2, 5, 2, 8, 5, 5, 8, 5, 8, 5}. In accordance with step 206, the sorted records would appear in access rate order as shown below in Table 1.

TABLE 1

| Record | Access Rate |
|---|---|
| $r_1$ | 2 |
| $r_3$ | 2 |
| $r_2$ | 5 |
| $r_5$ | 5 |
| $r_6$ | 5 |
| $r_8$ | 5 |
| $r_{10}$ | 5 |
| $r_4$ | 8 |
| $r_7$ | 8 |
| $r_9$ | 8 |

In step 208, the subscriber records 25 are partitioned according to their access rates into groups, or subsets, $S_0, \ldots, S_k$, wherein the subset $S_i$ contains subscriber records 25 with an access rate of i. In step 210, the subscriber records within each subset are sorted according to their subscriber ID number. Applied to the records of the present example, the records are partitioned into subsets $S_0, \ldots, S_9$, and ordered as follows:

TABLE 2

| Subset | Record Set |
|---|---|
| $S_0$ | { } |
| $S_1$ | { } |
| $S_2$ | {$r_1, r_3$} |
| $S_3$ | { } |
| $S_4$ | { } |
| $S_5$ | {$r_2, r_5, r_6, r_8, r_{10}$} |
| $S_6$ | { } |
| $S_7$ | { } |
| $S_8$ | {$r_4, r_7, r_9$} |
| $S_9$ | { } |

It will be noted from the above list that subsets $S_0$, $S_1$, $S_3$, $S_4$, $S_6$, $S_7$, and $S_9$ are empty subsets since there are no subscriber records having their associated access rates, and that subsets $S_2$, $S_5$, and $S_8$ are non-empty since there are records having their associated access rates.

Figure 3:
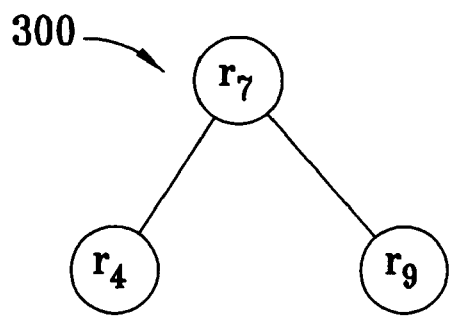
FIGS. 3 and 4 exemplify high frequency rootage trees embodying features of the present invention.

In step 212, an optimal (i.e., ideal) binary tree, well-known in the art, is generated based on the subscriber ID and the access rate of each respective record for the n non-empty subsets $S_i$ containing records having the highest access rate. n is a positive integer computed to ensure that at least a predetermined minimum number of records are inserted into the binary tree to form the root of the tree. The predetermined minimum number of records may range from about 3 to about 500 records and, typically, from about 10 to about 100 records and, preferably, about 50 records. In the present example, if n were 1 and a minimum number of 3 records were required, then $S_8$ would be used to form an optimal binary tree based on the subscriber ID and access rate of each respective record, using methods well-known in the art. FIG. 3 exemplifies such an optimal binary tree, designated by the reference numeral 300, which tree will be referred to herein as a high-frequency rootage ("HFR") tree. While it is preferable that an optimal, or ideal, binary tree be generated in step 212, if the cost for generating an optimal binary tree is prohibitive, then a balanced binary tree may alternatively be generated, using a middle-rootage insertion method, described below with respect to FIG. 5.

In step 214, the records of each of the non-empty subsets $S_i$, other than the subset(s) from which the HFR tree 300 was generated in step 212, are ordered in a middle-rootage order, described below with respect to FIG. 5, based on the subscriber ID of each record. If the subset $S_8$ was used to generate the root portion of the HFR tree in step 212, then $S_5$ and $S_2$ are the two remaining non-empty subsets. Accordingly, the subset $S_5$ would be ordered as {$r_6, r_2, r_8, r_5, r_{10}$}, and the subset $S_2$ would be ordered as {$r_1, r_3$}.

In step 216, the records 25 contained by the non-empty subset $S_i$ having the highest access rate that have not been added to the HFR tree 300, are then added to the HFR tree in the order determined in step 214 such that the binary search property of the HFR tree is preserved.

Figure 4:
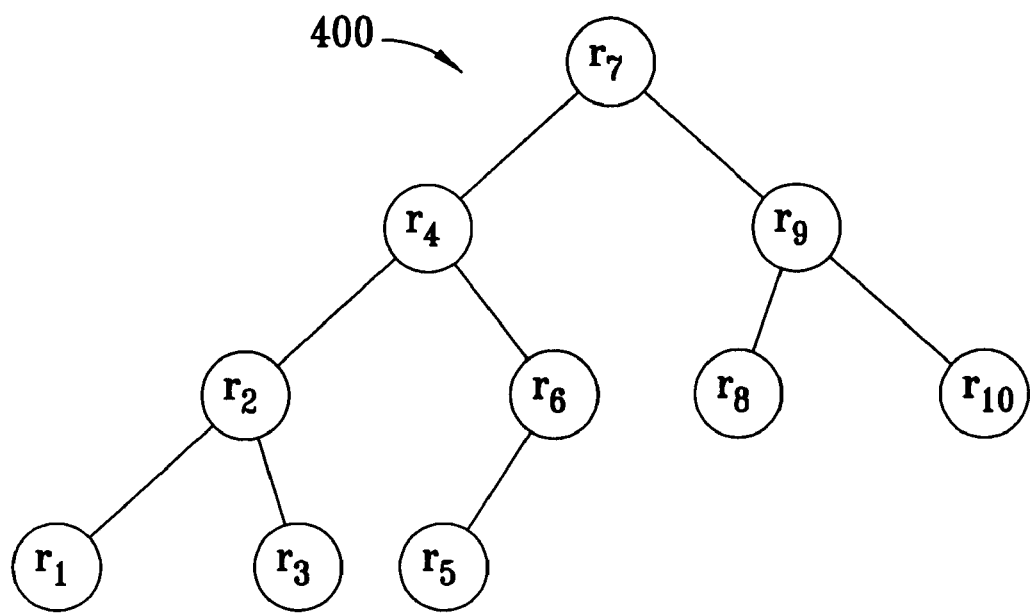

In step 218, a determination is made whether all non-empty subsets $S_i$ have been added to the HFR tree 300. If it is determined that there is at least one non-empty subset $S_i$ that has not yet been added to the HFR tree 300, then execution returns to step 216. In the application of steps 216 and 218 to the present example, records of the subset $S_5$, followed by records of the subset $S_2$, would be added to the HFR tree 300. A determination in step 218 that all non-empty subsets $S_i$ have been added to the HFR tree 300 signifies that an HFR tree 400, such as shown in FIG. 4, has been generated, and execution returns to step 200.

As described above, if it is determined in step 204 that the subscriber records 25 are arranged in an existing binary tree of subscriber records, such as the HFR tree 400, then execution proceeds to steps 220 and 222 to regenerate the tree. In step 220, in-order traversal, well-known in the art, is utilized to order the subscriber records 25 in the existing binary tree into a linear array in ascending order of the subscriber ID of each record. In accordance with in-order traversal, records are re-ordered in a linear array beginning with the left-most records of the tree, such as viewed in FIGS. 3 and 4, and moving toward the records on the right side of the tree. For example, in FIG. 4, the record $r_1$ would be added first into a linear array, then the record $r_2$, followed by the record $r_3$. When records, such as the records $r_4$ and $r_5$, are vertically aligned so that neither record is left of the other, then the uppermost record(s) is entered into the linear array first. Thus, in FIG. 4, record $r_4$ would be entered into the linear array before the record $r_5$. Applying in-order traversal to all of the records of the tree 400 in FIG. 4 would result in the linear array of records ordered as: {$r_1, r_2, r_3, r_4, r_5, r_6, r_7, r_8, r_9, r_{10}$}. It can be appreciated that by applying in-order traversal to an existing binary tree, a linear array may be generated in which records are ordered in increasing order according to the subscriber ID of the records. Thus, when a binary tree exists, in-order traversal may be used to generate a linear array of subscriber records ordered according to subscriber ID's without executing an expensive sorting routine, resulting in a processing cost savings.

In step 222, a sorting algorithm, such as a counting sort, a radix sort, or the like, which preserves the subscriber ID order of the subscriber records with the same access rate, is used to sort the records in access rate order. In step 224, the records are partitioned into subsets $S_0, \ldots, S_k$, where each subset $S_i$ contains records which are in subscriber ID order and which have an access rate of i. Execution then resumes at step 212.

It is noted that new records 25 may, at any time, be added to the HFR tree 400, based only on the subscriber ID of the new record, such that the binary search property of the tree is preserved. Because new subscriber records will be added to the HFR tree based solely on the subscriber ID of the record, and because access rates of subscribers will change periodically, it can be appreciated that the foregoing steps 220 to 224, which enable the tree to be periodically regenerated, ensure that highly accessed subscriber records are located at the "top" of the search tree.

Figure 5:
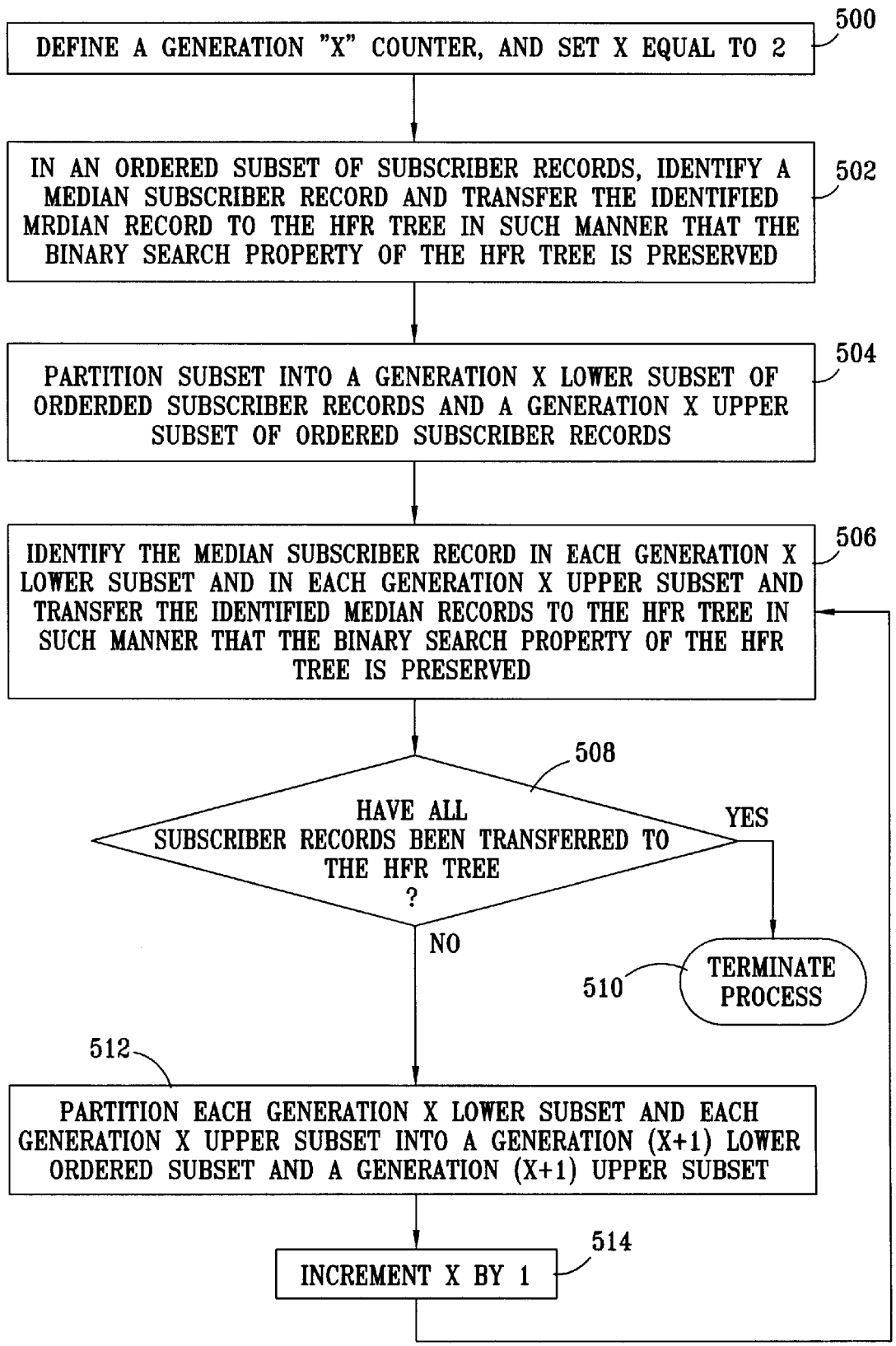
FIG. 5 is a flow chart illustrating steps for implementing a middle-rootage method.

FIG. 5 depicts steps that may be implemented to perform the middle-rootage insertion method, discussed above with respect to steps 212, 214, and 216 of FIG. 2. In step 500, a generation "X" counter is defined, where X is initially set equal to 2.

In step 502, in a subset of subscriber records ordered by subscriber ID, a median subscriber record of the subset is identified. As used herein, the median subscriber record is defined such that the number of records having subscriber ID's numerically less than the subscriber ID of the median record is within one record of the number of records having subscriber ID's numerically greater than the subscriber ID of the median record. The identified record is then transferred to the HFR tree in such a manner that the binary search property of the HFR tree is preserved.

In step 504, the subset of step 502 is partitioned into a generation X "lower" subset of ordered subscriber records and a generation X "upper" subset of ordered subscriber records, wherein the lower subset contains subscriber records having subscriber ID's which are numerically less than the subscriber ID of the median subscriber record of the subset, and the upper subset contains subscriber records having subscriber ID's which are numerically greater than the subscriber ID of the median subscriber record of the subset.

In step 506, the median subscriber record in each generation X lower subset and each generation X upper subset is identified and transferred to the HFR tree in such a manner that the binary search property of the HFR tree is preserved.

In step 508, a determination is made whether all subscriber records of the ordered subset of step 502 have been transferred to the HFR tree. If it is determined that all subscriber records have been so transferred, then execution of the middle-rootage insertion method terminates at step 510; otherwise, execution proceeds to step 512.

In step 512, each generation X lower subset of subscriber records and each generation X upper subset of subscriber records are partitioned into a generation (X+1) lower subset of ordered subscriber records and a generation (X+1) upper subset of ordered subscriber records.

In step 514, X is incremented by 1, and execution returns to step 506.

FIG. 6 exemplifies how the steps described above with respect to FIG. 5 are executed on a subset having 15 ordered subscriber records defined by the subset $\{r_1, r_2, r_3, r_4, r_5, r_6, r_7, r_8, r_9, r_{10}, r_{11}, r_{12}, r_{13}, r_{14}, r_{15}\}$. It is noted that median records identified in a single step may be transferred to the binary tree in any order. For example, in the group of median records $r_1, r_3, r_5, r_7, r_9, r_{11}, r_{13}$, and $r_{15}$, the records may be transferred to the binary tree in any order. If, however, for the sake of illustration, such records are transferred in ascending order, then the records in middle-rootage order will be transferred in the order of $r_8, r_4, r_{12}, r_2, r_6, r_{10}, r_{14}, r_1, r_3, r_5, r_7, r_9, r_{11}, r_{13}, r_{15}$. In light of the foregoing, it is considered that FIG. 6 is otherwise self-explanatory and does not warrant further discussion herein.

By the use of the method of the present invention, a binary tree may be economically generated which can quickly and efficiently access subscriber records in location databases and which is, therefore, also more economical to use than is possible with conventional binary trees.

It is understood that the present invention can take many forms and embodiments. Accordingly, several variations may be made in the foregoing without departing from the spirit or the scope of the invention. For example, in step 206 (FIG. 2), in lieu of the middle-rootage method, each of the non-empty subsets $S_i$ may be ordered in a manner well-known in the art by first generating from subscriber records in the subset a balanced binary tree based on the subscriber ID of the respective records, and then extracting the subscriber records from the generated binary tree using breadth-first traversal wherein records are extracted in the binary tree in top-to-down and left-to-right order. Specifically, the root is extracted first, all of its "first-generation children" are extracted next in a left-to-right order, then all "second-generation children" are extracted in a left-to-right order, and so on until the bottom of the tree is reached and extracted. In another example, in step 202, each subset may contain subscriber records which fall within a range of access rates rather than being equal to a single access rate.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A method for ordering subscriber records in a location database stored in at least one of a Visitor Location Register (VLR) or a Home Location Register (HLR) of a communications network, the method comprising, for each location database:

a) partitioning the subscriber records into subsets according to the access rate of each respective record, wherein each respective subset contains all subscriber records having a particular access rate associated with the respective subset; and b) inserting the subscriber records of each subset into a binary tree in subset sequence according to the access rate associated with each respective subset, beginning with the subset containing subscriber records having the highest access rate, and finishing with the subset containing subscriber records having the lowest access rate and, within each respective subset, the subscriber records according to a middle-rootage order based on an identification number associated with each respective subscriber record, beginning with a median subscriber record.

2. The method of claim 1 wherein the step of inserting the subscriber records of each subset into a binary tree further comprises:

defining a variable n as a positive integer;

generate an optimal binary tree using the subscriber records of the n subsets containing subscriber records having the highest access rate, based on an identification number and access rate associated with each respective subscriber record; and inserting into the binary tree the subscriber records of each subset, having an access rate less than the n subsets containing subscriber records having the highest access rate, in subset sequence according to the access rate associated with each respective subset, beginning with the subset containing subscriber records having the highest access rate, and finishing with the subset containing subscriber records having the lowest access rate and, within each respective subset, the subscriber records according to a middle-rootage order based on an identification number associated with each respective subscriber record, beginning with a median subscriber record.

3. The method of claim 2 wherein n is computed to ensure that at least a predetermined minimum number of records are used to form a root of the binary tree.

4. The method of claim 1 wherein the binary tree is a high-frequency rootage ("HFR") tree.

5. The method of claim 1 further comprising:
storing for each subscriber record in the location database an access counter defining a numerical value;
incrementing by one the numerical value of the access counter associated with a respective subscriber record each time the respective subscriber record is accessed during a predetermined period of time; and
equating the access rate of each respective subscriber record to the numerical value of the access counter associated with each respective subscriber record.

6. The method of claim 1 wherein the step of inserting the subscriber records of each respective subset according to a middle-rootage order further comprises, for each respective subset:
a) defining a generation X counter, where X is a variable;
b) identifying a median subscriber record in the respective subset wherein the difference between the number of subscriber records in the respective subset having a subscriber identity number which is numerically less than the subscriber identity number of the median subscriber record, and the number of subscriber records having a subscriber identity number which is numerically greater than the subscriber identity number of the median subscriber record, is not greater than one record;
c) transferring the median subscriber record from the respective subset to the binary tree so that the binary search property of the binary tree is preserved;
d) partitioning the respective subset into a generation X lower subset of ordered subscriber records and a generation X upper subset of ordered subscriber records;
e) identifying the median subscriber record in each generation X lower subset and in each generation X upper subset, and transferring the identified median subscriber records to the binary tree so that the binary search property of the binary tree is preserved;
f) determining whether all subscriber records have been transferred to the binary tree;
g) upon a determination that all subscriber records have not been transferred to the binary tree, partitioning each generation X lower subset and each generation X upper subset into a generation (X+1) lower subset of ordered subscriber records and a generation (X+1) upper subset of ordered subscriber records; and
h) incrementing X by 1 and returning to the step of identifying the median subscriber record in each generation X lower subset and in each generation X upper subset.

7. The method of claim 1 wherein the VLR is collocated with a Mobile Switching Center (MSC).

8. The method of claim 1 wherein the VLR is collocated with a Mobile Switching Center (MSC) of a communications network.

9. The method of claim 1 further comprising the step performed prior to the step of partitioning:

a) using in-order traversal to order the subscriber records in a binary tree into a linear array in ascending order of the subscriber ID of each respective record; and
b) sorting the subscriber records according to the access rate of each respective record using a method that preserves the order of the respective subscriber records with the same access rate.

10. The method of claim 1 further comprising the step performed prior to the step of partitioning:
a) using in-order traversal to order the subscriber records in a binary tree into a linear array in ascending order of the subscriber ID of each respective record; and
b) sorting the subscriber records according to the access rate of the respective record using one of a radix-sort method or a counting-sort method.

11. A method for ordering subscriber records stored in a location database stored in at least one of a Visitor Location Register (VLR) or a Home Location Register (HLR) of a telecommunications network, the method comprising, for each location database:
a) apportioning the subscriber records into at least a first subset of subscriber records and at least a second subset of subscriber records, wherein each of the records contained in the first subset of subscriber records has an access rate exceeding the access rate of each of the records of the second subset;
b) generating a balanced binary tree from subscriber records contained in the first subset of subscriber records;
c) ordering the subscriber records in the second subset of subscriber records in a middle-rootage order; and
d) inserting the subscriber records ordered in the middle-rootage order into the balanced binary tree for retrieval through a subsequent binary search.

12. The method of claim 11 wherein the balanced binary tree is a high-frequency rootage ("HFR") tree.

13. The method of claim 11 further comprising:
storing for each subscriber record in the location database an access counter defining a numerical value;
incrementing by one the numerical value of the access counter associated with a respective subscriber record each time the respective subscriber record is accessed during a predetermined period of time; and
equating the access rate of each respective subscriber record to the numerical value of the access counter associated with each respective subscriber record.

14. The method of claim 11 wherein the step of generating a balanced binary tree using subscriber records contained in the first subset of subscriber records further comprises:
a) ordering the subscriber records in the first subset of subscriber records in a middle-rootage order; and
b) inserting the subscriber records of the first subset of subscriber records ordered in a middle-rootage order into the balanced binary tree for retrieval through a subsequent binary search.

15. The method of claim 11 wherein the step of generating a balanced binary tree using subscriber records contained in the first subset of subscriber records further comprises:
a) defining a generation X counter, where X is a variable;
b) identifying a median subscriber record in the first subset wherein the difference between the number of subscriber records in the first subset having a subscriber identity number which is numerically less than the subscriber identity number of the median subscriber record, and the number of subscriber records having a subscriber identity number which is numerically greater than the subscriber identity number of the median subscriber record, is not greater than one record;

c) transferring the median subscriber record from the first subset to the binary tree so that the binary search property of the binary tree is preserved;

d) partitioning the first subset into a generation X lower subset of ordered subscriber records and a generation X upper subset of ordered subscriber records;

e) identifying the median subscriber record in each generation X lower subset and in each generation X upper subset, and transferring the identified median subscriber records to the binary tree so that the binary search property of the binary tree is preserved;

f) determining whether all subscriber records contained by the first subset have been transferred to the binary tree;

g) upon a determination that all subscriber records contained by the first subset have not been transferred to the binary tree, partitioning each generation X lower subset and each generation X upper subset into a generation (X+1) lower subset of ordered subscriber records and a generation (X+1) upper subset of ordered subscriber records; and h) incrementing X by 1 and returning to the step of identifying the median subscriber record in each generation X lower subset and in each generation X upper subset.

16. The method of claim 11 wherein a subscriber identity number is uniquely associated with each subscriber record, and the steps of ordering and inserting further comprise:

a) defining a generation X counter, where X is a variable;

b) identifying a median subscriber record in the second subset wherein the difference between the number of subscriber records in the second subset having a subscriber identity number which is numerically less than the subscriber identity number of the median subscriber record, and the number of subscriber records having a subscriber identity number which is numerically greater than the subscriber identity number of the median subscriber record, is not greater than one record;

c) transferring the median subscriber record from the second subset to the binary tree so that the binary search property of the binary tree is preserved;

d) partitioning the second subset into a generation X lower subset of ordered subscriber records and a generation X upper subset of ordered subscriber records;

e) identifying the median subscriber record in each generation X lower subset and in each generation X upper subset, and transferring the identified median subscriber records to the binary tree so that the binary search property of the binary tree is preserved;

f) determining whether all subscriber records contained by the second subset have been transferred to the binary tree;

g) upon a determination that all subscriber records contained by the second subset have not been transferred to the binary tree, partitioning each generation X lower subset and each generation X upper subset into a generation (X+1) lower subset of ordered subscriber records and a generation (X+1) upper subset of ordered subscriber records; and h) incrementing X by 1 and returning to the step of identifying the median subscriber record in each generation X lower subset and in each generation X upper subset.

17. The method of claim 11 wherein the VLR is collocated with a Mobile Switching Center (MSC).

18. The method of claim 11 wherein the VLR is collocated with a Mobile Switching Center (MSC) of a telecommunications network.

19. The method of claim 11 further comprising the step performed prior to the step of apportioning:

a) using in-order traversal to order the subscriber records in a binary tree into a linear array in ascending order of the subscriber ID of each record; and b) sorting the subscriber records according to the access rate of the respective record using a sorting method that preserves the order of the subscriber records with the same access rate.

20. The method of claim 11 further comprising the step performed prior to the step of apportioning:

a) using in-order traversal to order the subscriber records in a binary tree into a linear array in ascending order of the subscriber ID of each record; and b) sorting the subscriber records according to the access rate of the respective record using one of a radix-sort method or a counting-sort method.

21. A method for ordering subscriber records in a location database stored in at least one of a Visitor Location Register (VLR) or a Home Location Register (HLR) of a wireless communications network, the method comprising, for each location database:

a) partitioning the subscriber records into subsets according to the access rate of each respective record, wherein each respective subset contains all subscriber records having a particular access rate associated with the respective subset; and b) defining a variable n as a positive integer;

c) inserting into an optimal binary tree the subscriber records of the n subsets containing subscriber records having the highest access rate, based on an identification number and the access rate associated with each respective subscriber record; and d) inserting into the binary tree the subscriber records of each subset, having an access rate less than the n subsets containing subscriber records having the highest access rate, in subset sequence according to the access rate associated with each respective subset, beginning with the subset containing subscriber records having the highest access rate, and finishing with the subset containing subscriber records having the lowest access rate and, within each respective subset, the subscriber records according to a middle-rootage order based on an identification number associated with each respective subscriber record, beginning with a median subscriber record.

22. The method of claim 21 wherein n is computed to ensure that at least a predetermined minimum number of records are used to form a root of the binary tree.

23. The method of claim 21 wherein the binary tree is a high-frequency rootage ("HFR") tree.

24. The method of claim 21 further comprising:

storing for each subscriber record in the location database an access counter defining a numerical value;

incrementing by one the numerical value of the access counter associated with a respective subscriber record each time the respective subscriber record is accessed during a predetermined period of time; and equating the access rate of each respective subscriber record to the numerical value of the access counter associated with each respective subscriber record.

25. The method of claim 21 wherein the step of inserting the subscriber records of each respective subset according to a middle-rootage order further comprises, for each respective subset:

a) defining a generation X counter, where X is a variable;

b) identifying a median subscriber record in the respective subset wherein the difference between the number of subscriber records in the respective subset having a subscriber identity number which is numerically less than the subscriber identity number of the median subscriber record, and the number of subscriber records having a subscriber identity number which is numerically greater than the subscriber identity number of the median subscriber record, is not greater than one record;

c) transferring the median subscriber record from the respective subset to the binary tree so that the binary search property of the binary tree is preserved;

d) partitioning the respective subset into a generation X lower subset of ordered subscriber records and a generation X upper subset of ordered subscriber records;

e) identifying the median subscriber record in each generation X lower subset and in each generation X upper subset, and transferring the identified median subscriber records to the binary tree so that the binary search property of the binary tree is preserved;

f) determining whether all subscriber records have been transferred to the binary tree;

g) upon a determination that all subscriber records have not been transferred to the binary tree, partitioning each generation X lower subset and each generation X upper subset into a generation (X+1) lower subset of ordered subscriber records and a generation (X+1) upper subset of ordered subscriber records; and h) incrementing X by 1 and returning to the step of identifying the median subscriber record in each generation X lower subset and in each generation X upper subset.

26. The method of claim 21 wherein the VLR is collocated with a Mobile Switching Center (MSC).

27. The method of claim 21 wherein the VLR is collocated with a Mobile Switching Center (MSC) of a communications network.

28. The method of claim 21 further comprising the step performed prior to the step of partitioning:

a) using in-order traversal to order the subscriber records in a binary tree into a linear array in ascending order of the subscriber ID of each respective record; and b) sorting the subscriber records according to the access rate of each respective record using a method that preserves the order of the respective subscriber records with the same access rate.

29. The method of claim 21 further comprising the step performed prior to the step of partitioning:

a) using in-order traversal to order the subscriber records in a binary tree into a linear array in ascending order of the subscriber ID of each respective record; and b) sorting the subscriber records according to the access rate of the respective record using one of a radix-sort method or a counting-sort method.

* * * * *